(12) United States Patent
Schmidt et al.

(10) Patent No.: US 6,366,245 B1
(45) Date of Patent: Apr. 2, 2002

(54) DEVICE FOR DIRECTIONALLY EMITTING AND/OR RECEIVING ELECTROMAGNETIC RADIATION

(75) Inventors: Ewald Schmidt, Ludwigsburg; Klaus Voigtlaender, Wangen; Bernhard Lucas, Besigheim; Thomas Beez, Weinsberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/468,197

(22) Filed: Dec. 21, 1999

(30) Foreign Application Priority Data

Dec. 21, 1998 (DE) .......................................... 198 59 002

(51) Int. Cl.⁷ ................................................. H01Q 1/38
(52) U.S. Cl. ............................... 343/700 MS; 343/753; 343/785; 343/909
(58) Field of Search ................................. 343/753, 754, 343/909, 911 R, 700 MS, 872; H01Q 19/06, 15/02

(56) References Cited

U.S. PATENT DOCUMENTS 5,757,323 A * 5/1998 Spencer ...................... 343/909
6,028,560 A * 2/2000 Pfizenmaier et al. ........ 343/753
6,075,492 A * 6/2000 Schmidt et al. ............. 343/753
6,111,551 A * 8/2000 Schmidt et al. ............. 343/872

FOREIGN PATENT DOCUMENTS

| DE | 197 10 811 | 9/1998 | .......... H01Q/19/06 |
| EP | 0 498 524 | 8/1992 | .......... H01Q/15/02 |
| WO | 97 02496 | 1/1997 | ............. G01S/7/03 |

* cited by examiner

Primary Examiner—Don Wong
Assistant Examiner—Hoang Nguyen
(74) Attorney, Agent, or Firm—Kenyon & Kenyon

(57) ABSTRACT

A device for directionally emitting and/or receiving electromagnetic radiation includes at least one printed circuit board having at least one transmitting/receiving element, at least one focusing dielectric lens, and at least one additional prefocusing body, which is positioned between the transmitting/receiving element and the dielectric lens. A cover is positioned in the plane between the transmitting/receiving element and the dielectric lens, the cover having at least one bushing for the additional prefocusing body, and the cover surrounding and fixing in place the additional prefocusing body held in the bushing.

17 Claims, 2 Drawing Sheets

DEVICE FOR DIRECTIONALLY EMITTING AND/OR RECEIVING ELECTROMAGNETIC RADIATION

FIELD OF THE INVENTION

The present invention relates to a device for directionally emitting and/or receiving electromagnetic waves, the device including at least one transmitting/receiving element, as well as a dielectric lens. The at least one transmitting/receiving element, subsequently referred to in general as aerial element, is used in this context for exciting or actually receiving the electromagnetic waves. The dielectric lens is used for generating a directional effect or desired antenna lobes. An application of the device according to the present invention is, for example, in a motor vehicle's radar system for detecting vehicles driving in front.

BACKGROUND INFORMATION

A device, including at least one aerial element as well as a dielectric lens, is described, for example, in European Patent No. 0 498 524. It also describes a motor-vehicle radar system designed for detecting vehicles driving up ahead. In this case, there is a so-called bistatic radar sensor, i.e., a radar sensor having separate aerials for the transmission and receiving paths. Independently of this special feature, each of the two aerials includes a dielectric lens and at least one aerial element. The difficulty with such a device, particularly with a transmitting aerial, is that the angle of aperture of the aerial element(s) is normally wider than the dielectric lens. This means that a portion of the generated electromagnetic wave spills over the dielectric lens. Accordingly, this component is not focused by the dielectric lens in the desired direction, which reduces the overall aerial gain of the device.

PCT International Publication No. WO 97/02496 describes a monostatic radar sensor which is also designed for use in motor vehicles. In this context, monostatic means that the same aerial is used for the transmission path and the receiving path.

In this case, the aerial includes at least three aerial elements, as well as a dielectric lens positioned in front of them. To avoid lens spillover in the transmission case, it discusses positioning a so-called polyrod in front of each aerial element. This polyrod is a roughly conical dielectric body, whose dielectric properties effect a prefocusing of the generated electromagnetic wave. In this arrangement, difficulties are posed by the precise adjustment of the individual polyrods. Every deviation, be it ever so small, from the ideal position causes, in turn, lens spillover.

A device for directionally emitting and/or receiving electromagnetic waves is known from German Patent No. 197 10 811. This device is made up of at least one aerial element, a dielectric lens, and a dielectric body, which is positioned between the aerial elements and the dielectric lens. The purpose of this dielectric body is to avoid dielectric lens spillovers and to prefocus the electromagnetic waves emitted by and/or received from the aerial element. To simplify the required, exact adjustment, the dielectric body extends out two-dimensionally. The pot-shaped dielectric body forms, in conjunction with a base plate on which additional electronic components are arranged, a hermetically impervious enclosure for the aerial element and the additional electronic components.

SUMMARY OF THE INVENTION

An object of the present invention is, accordingly, to provide a device which, on the one hand, will prevent spillover of a focusing element and, on the other hand, will enable an exact adjustment of prefocusing elements.

According to the present invention, this objective is achieved by a device for directionally emitting and/or receiving electromagnetic waves, the device including at least one printed circuit board having at least one transmitting/receiving element, at least one focusing dielectric lens, and at least one additional prefocusing body, which is positioned between the transmitting/receiving element and the dielectric lens, a cover being positioned in the plane between the transmitting/receiving element and the dielectric lens, the cover having at least one bushing for the additional prefocusing body and surrounding and fixing in place the additional prefocusing body held in the bushing. An advantage of this design approach is that the cover of the present invention first of all prevents a spillover of the focusing dielectric lens, and secondly, fixes the additional prefocusing body in its position, by holding it in the bushing of the cover. This has the particular advantage of making an exact adjustment possible when mounting the prefocusing body.

It is especially advantageous that the additional prefocusing body is a dielectric rod antenna, a dielectric lens, a plane-parallel dielectric plate, an aperture plate, a slotted diaphragm, and/or a metal plate lens. All of these variants of the device according to the present invention are especially well suited for prefocusing the electromagnetic waves emitted by and/or received from the transmitting/receiving elements, in or from the direction of the dielectric lens, respectively.

In accordance with one particular embodiment of the device according to the present invention, the cover is designed to absorb electromagnetic waves. This absorption effect prevents a spillover of the focusing element in a very unique manner.

The cover rests advantageously on the printed circuit board and/or surrounds the transmitting/receiving element in a hood-like fashion. This embodiment of the device according to the present invention ensures that the transmitting/receiving elements, which are a substantial source of electromagnetic waves, are reliably covered. At the same time, the cover dimensions are no greater than necessary in this case.

In another advantageous embodiment, the cover surrounds the transmitting/receiving element right down to the location of the bushing, rendering the element impervious to high frequencies. According to the present invention, the additional prefocusing body, which focuses electromagnetic waves, but does not completely absorb or shield from them, is positioned at the location of the bushing. Because this cover is impervious to high frequencies, high frequency, electromagnetic scattered radiation is shielded in a particularly advantageous fashion and, therefore, cannot escape from the inside of the device according to the present invention.

As material for the cover, one uses advantageously at least plastic filled with graphite or plastic filled with steel fiber. These advantageous materials provide an especially good absorption and shielding effect for electromagnetic waves, depending on the ratio of graphite to plastic or steel fiber to plastic in the mixture.

In accordance with one advantageous refinement of the device of the present invention, the transmitting/receiving element is designed as a patch antenna element manufactured using microstrip technology. This type of antenna (aerial) element offers, inter alia, the advantages of large-scale production and especially small size.

The application of the device according to the present invention is especially advantageous when the occurring electromagnetic waves are in the microwave range. This is particularly the case when working with a motor vehicle's radar system for detecting vehicles driving up ahead.

Furthermore, in accordance with a special refinement of the device of the present invention, at least one circuit arrangement is configured on the printed circuit board. This has the advantage that the component parts combined in the circuit arrangement are surrounded by the cover as well.

DETAILED DESCRIPTION

Figure 1:
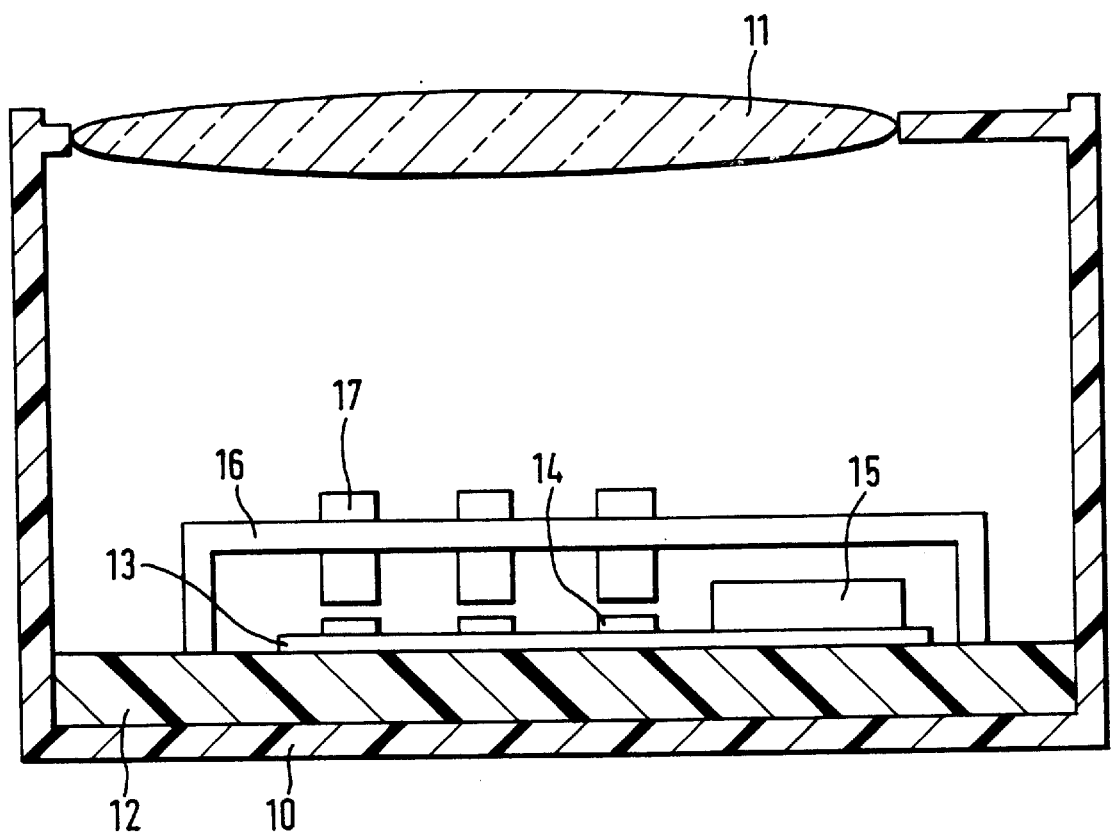
FIG. 1 shows a first specific embodiment of the device according to the present invention.

FIG. 1 depicts a first exemplary embodiment of the device according to the present invention for directionally emitting and/or receiving electromagnetic waves. In this embodiment, this device is, for example, a motor vehicle's radar system for detecting automobiles driving up ahead. Its cross-sectional view is illustrated in FIG. 1. The device according to the present invention includes a housing 10, which is closed in the beam direction by a focusing dielectric lens 11. A printed circuit board 13 is disposed inside housing 10 on a base plate 12. In this embodiment, three transmitting/receiving elements 14, for example, are mounted on printed circuit board 13. In addition, a circuit arrangement 15 is integrated on the printed circuit board. Printed circuit board 13 having transmitting/receiving elements 14 and circuit arrangement 15 mounted thereon is surrounded by a cover 16 of the present invention in a hood-like fashion, the cover being fastened to the base plate. Disposed inside cover 16, on printed circuit board 13 at the locations of the transmitting/receiving elements 14, are bushings, into which prefocusing bodies 17 are inserted. Configuring prefocusing bodies 17 in this manner in the bushings of cover 16 fixes the prefocusing bodies in their position.

Interfering high frequency radiation can be produced in the area between cover 16 and base plate 12 by the wiring system leading to the transmitting/receiving elements. This wiring system includes the components, known to one skilled in the art, of a motor vehicle's radar system which operates in the microwave range. To adequately shield or absorb this interfering high frequency radiation, so that this spurious emission does not escape through focusing dielectric lens 11 from housing 10, cover 16 is manufactured from a material which absorbs electromagnetic waves or constitutes a barrier for high-frequency electromagnetic waves. Plastic filled with graphite or plastic filled with steel fibers presents itself, in particular, as a material having these properties.

Transmitting/receiving elements 14 shown in FIG. 1 are designed as patch antenna elements manufactured using microstrip technology. In the transmitting case, the electromagnetic waves emitted from these aerial elements are prefocused by prefocusing bodies 17, and focused by focusing dielectric lens 11 in the final target direction. In the case of a motor vehicle's radar system, this target direction is, e.g., a vehicle driving out front that needs to be detected. The path of the electromagnetic waves is then reversed, accordingly, in the receiving direction. A motor vehicle's radar system, such as the one shown in FIG. 1, can be designed as a monostatic radar system. This radar system makes it is possible to simultaneously transmit and receive electromagnetic waves.

Figure 2:
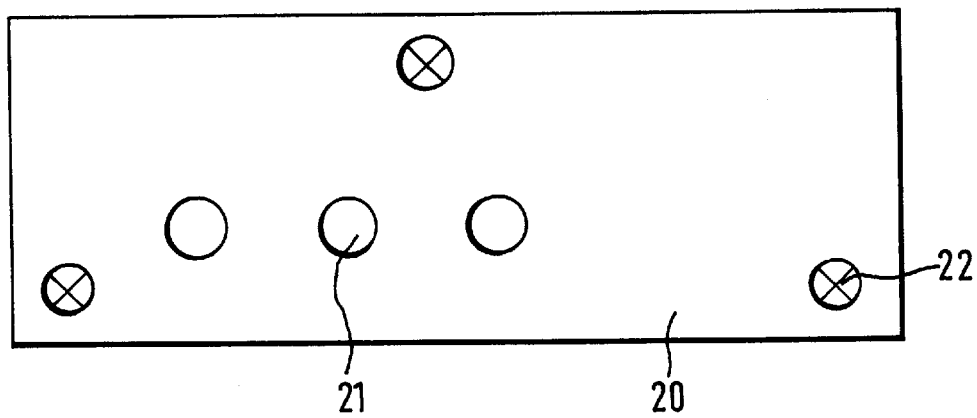
FIG. 2 shows a cover, as used in the device according to the present invention, in a different view.

FIG. 2 shows a cover 20 which, from the dimensions, could represent, e.g., a view of cover 16 illustrated in FIG. 1, from the direction of dielectric lens 11. Three bushings 21, into which prefocusing bodies can be inserted, as shown in FIG. 1, are configured inside cover 20. Furthermore, three fixing points 22 are shown which, analogously to FIG. 1, can be used to securely join cover 20 to a base plate in a motor vehicle's radar system. Screws can be used, e.g., for the connection at illustrated fixing points 22. A bonding or hooking of cover 20 would be equally possible.

Figure 3:
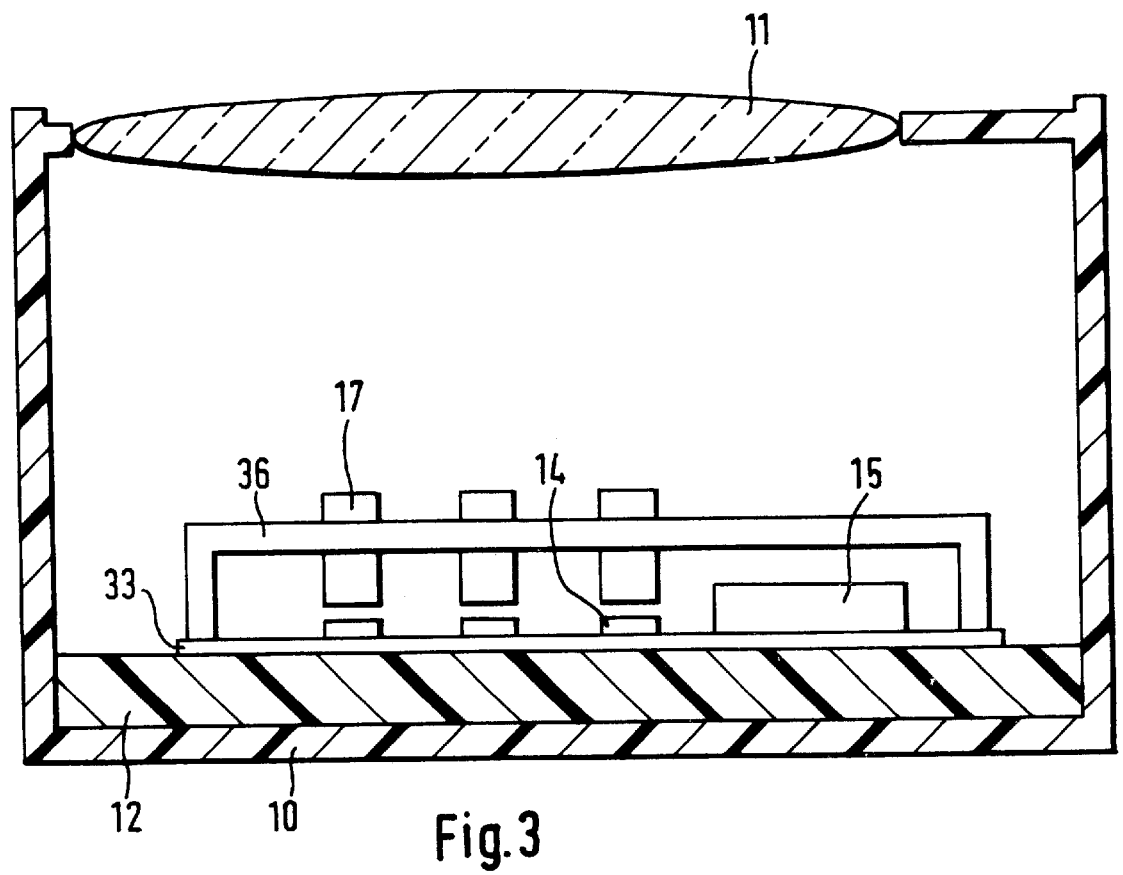
FIG. 3 shows a second exemplary embodiment of the device according to the present invention.

A second exemplary embodiment of the device according to the present invention for directionally emitting and/or receiving electromagnetic radiation is shown in FIG. 3. This embodiment relates to a motor vehicle's radar system as well, which mainly has components analogous to those in FIG. 1. These components analogous to those in FIG. 1 are indicated by reference numerals identical to those in FIG. 1. The main difference from the previous embodiment shown in FIG. 1 is that printed circuit board 33, which is positioned on base plate 12, has dimensions greater than those of printed circuit board 13 in FIG. 1. The greater dimensions of printed circuit board 33 make it possible for cover 36 to rest directly on the printed circuit board. A decided advantage of this specific embodiment is that the complete unit, including printed circuit board 13, transmitting/receiving elements 14, circuit arrangement 15, prefocusing bodies 17, and cover 36, can be assembled separately and brought as a complete unit into housing 10, onto base plate 12.

In both the first and second exemplary embodiments, covers 16 and 36, respectively, have a one-piece construction. However, it is within the framework of the device according to the present invention for these covers to be made of several sections. Important in this context is merely that the cover have the described effect of absorbing electromagnetic waves or of being impervious to high-frequency electromagnetic waves.

Figure 4:
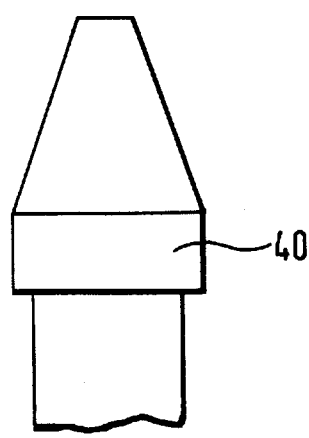
FIG. 4 shows a sectional view of a dielectric rod antenna (polyrod).

FIG. 4 shows a dielectric rod antenna (polyrod) which is inserted quite advantageously as a prefocusing body into the bushings of the cover. In an especially advantageous manner, this polyrod 40 redirects the electromagnetic waves to be transmitted or received. In addition, dielectric lenses, plane-parallel dielectric plates, aperture plates, slotted diaphragms, or metal plate lenses can be used as prefocusing bodies. Depending on the specific embodiment of the device according to the present invention, it can be advantageous in this context to either use only the same type of prefocusing bodies, or various types of prefocusing bodies.

Covers 16 and 36 illustrated in the exemplary embodiments and having appropriate prefocusing bodies 17 can, for example, be manufactured using a multicomponent injection-molding process. In this context, cover 16 or 36 is first fabricated in an injection molding process, and the prefocusing elements made from microwave-conductive material are then inserted in an additional injection molding process. With this fabrication method, the covers having the integrated prefocusing bodies are able to be manufactured very cost-effectively and precisely. This precise manufacturing method is necessary in order to permit an exact adjustment of the prefocusing bodies during subsequent assembly.

What is claimed is:

1. A device for at least one of directionally emitting and receiving electromagnetic radiation, comprising:
   at least one printed circuit board having at least one transmitting/receiving element;
   at least one focusing dielectric lens;
   at least one additional prefocusing body situated between the at least one transmitting/receiving element and the at least one focusing dielectric lens; and
   a cover situated in a plane between the at least one transmitting/receiving element and the at least one focusing dielectric lens, the cover having at least one bushing for the at least one additional prefocusing body, the cover surrounding and fixing in place the at least one additional prefocusing body held in the at least one bushing.

2. The device according to claim 1, wherein the at least one additional prefocusing body includes at least one of:
   a dielectric rod antenna,
   a dielectric lens,
   a plane-parallel dielectric plate,
   an aperture plate,
   a slotted diaphragm, and
   a metal plate lens.

3. The device according to claim 1, wherein the cover absorbs electromagnetic waves.

4. The device according to claim 3, wherein the electromagnetic waves are in a microwave range.

5. The device according to claim 1, wherein the cover surrounds the transmitting/receiving element in a hood-like fashion.

6. The device according to claim 5, wherein the cover surrounds the transmitting/receiving element down to a location of the bushing, rendering the transmitting/receiving element impervious to high frequencies.

7. The device according to claim 1, wherein the cover is composed of a plastic material filled with at least one of graphite and steel fibers.

8. The device according to claim 1, wherein the transmitting/receiving element includes a patch antenna manufactured using microstrip technology.

9. The device according to claim 1, further comprising at least one circuit arrangement situated on the printed circuit board.

10. A device for at least one of directionally emitting and receiving electromagnetic radiation, comprising:
    at least one printed circuit board having at least one transmitting/receiving element;
    at least one focusing dielectric lens;
    at least one additional prefocusing body situated between the at least one transmitting/receiving element and the at least one focusing dielectric lens; and
    a cover situated in a plane between the at least one transmitting/receiving element and the at least one focusing dielectric lens, the cover having at least one bushing for the at least one additional prefocusing body, the cover surrounding and fixing in place the at least one additional prefocusing body held in the at least one bushing, wherein the cover rests on the printed circuit board.

11. The device according to claim 10, wherein the at least one additional prefocusing body includes at least one of:
    a dielectric rod antenna,
    a dielectric lens,
    a plane-parallel dielectric plate,
    an aperture plate,
    a slotted diaphragm, and
    a metal plate lens.

12. The device according to claim 10, wherein the cover absorbs electromagnetic waves.

13. The device according to claim 10, Wherein the cover surrounds the transmitting/receiving element in a hood-like fashion.

14. The device according to claim 13, wherein the cover surrounds the transmitting/receiving element down to a location of the bushing, rendering the transmitting/receiving element impervious to high frequencies.

15. The device according to claim 10, wherein the cover is composed of a plastic material filled with at least one of graphite and steel fibers.

16. The device according to claim 10, wherein the transmitting/receiving element includes a patch antenna manufactured using microstrip technology.

17. The device according to claim 10, further comprising at least one circuit arrangement situated on the printed circuit board.

* * * * *